(12) United States Patent
Nowak

(10) Patent No.: US 10,936,706 B2
(45) Date of Patent: Mar. 2, 2021

(54) BIOMETRIC AUTHENTICATION

(71) Applicant: Mastercard International Incorporated, Purchase, NY (US)

(72) Inventor: Dawid Nowak, Dublin (IE)

(73) Assignee: Mastercard International Incorporated, Purchase, NY (US)

( * ) Notice: Subject to any disclaimer, the term of this patent is extended or adjusted under 35 U.S.C. 154(b) by 94 days.

(21) Appl. No.: 15/975,063

(22) Filed: May 9, 2018

(65) Prior Publication Data

US 2018/0349586 A1    Dec. 6, 2018

(30) Foreign Application Priority Data

May 31, 2017    (EP) .................................. 17173837

(51) Int. Cl.
*H04L 29/06* (2006.01)
*G06F 21/32* (2013.01)
*G06Q 20/38* (2012.01)
*G06Q 20/40* (2012.01)
*G06Q 20/32* (2012.01)
*G06Q 20/02* (2012.01)
*G06K 9/00* (2006.01)
*H04M 1/02* (2006.01)

(52) U.S. Cl.
CPC ......... *G06F 21/32* (2013.01); *G06K 9/00087* (2013.01); *G06K 9/00288* (2013.01); *G06Q 20/02* (2013.01); *G06Q 20/3224* (2013.01); *G06Q 20/382* (2013.01); *G06Q 20/4016* (2013.01); *G06Q 20/40145* (2013.01); *H04L 63/0861* (2013.01); *H04M 1/0202* (2013.01)

(58) Field of Classification Search
CPC .. G06F 21/32; H04M 1/0202; G06K 9/00288; G06K 9/00087; H04L 63/0861; G06Q 20/40145; G06Q 20/382; G06Q 20/3224; G06Q 20/02; G06Q 20/4016
See application file for complete search history.

(56) References Cited

U.S. PATENT DOCUMENTS 10,025,914 B1 *  7/2018  Hatch ................... G06F 21/316
2016/0055182 A1   2/2016  Petrou et al.
(Continued)

OTHER PUBLICATIONS

"Communication: Extended European Search Report", dated Aug. 8, 2017 (Aug. 8, 2017), European Patent Office, for European Application No. 17173837.0-1870, 8pgs.
(Continued)

*Primary Examiner* — Brandon S Hoffman
*Assistant Examiner* — William A Corum, Jr.
(74) *Attorney, Agent, or Firm* — Buckley, Maschoff & Talwalkar LLC

(57) ABSTRACT

There is presented a method, a computing device and a biometric matching service, for the biometric authentication of a user. The method comprises capturing a biometric sample from a user and obtaining information to identify data sources relevant to the user. The method further comprises using the data sources relevant to the user to obtain a plurality of biometric samples potentially captured from the user. The method further comprises matching the captured biometric sample against the plurality of potentially captured biometric samples to determine whether the captured biometric sample represents the user.

9 Claims, 6 Drawing Sheets

(56) References Cited

U.S. PATENT DOCUMENTS

| | | |
|---|---|---|
| 2016/0132671 A1 | 5/2016 | Bud |
| 2016/0171291 A1 | 6/2016 | Papakipos et al. |
| 2017/0091533 A1 | 3/2017 | Mardikar |
| 2017/0171195 A1* | 6/2017 | Chang .................... G06F 21/32 |
| 2019/0095600 A1* | 3/2019 | Chan ..................... G06F 21/316 |

OTHER PUBLICATIONS

"PCT Notification of Transmittal of the International Search Report and the Written Opinion", dated Jun. 13, 2018 (Jun. 13, 2018), International Searching Authority, for International Application No. PCT/US2018/029558, 14pgs.

* cited by examiner

BIOMETRIC AUTHENTICATION

CROSS-REFERENCE TO RELATED APPLICATION

This application is a U.S. National Stage filing under 35 U.S.C. § 119, based on and claiming benefits of and priority to, European Patent Application No. 17173837.0 filed on May 31, 2017. The entire disclosure of the above application is incorporated herein by reference.

TECHNICAL FIELD

The present disclosure relates to improvements in biometric authentication and particularly, but not exclusively, to biometric authentication on a computing device. Aspects of the disclosure relate to a method, a computing device and a service.

BACKGROUND

Authentication is a process in which the credentials provided by a user are examined in order to confirm the identity of the user. This is usually done by comparing submitted credential values with stored credential values, typically stored in a database protected against subversion. If the submitted user credentials match those in the database, then the user is authenticated, which generally leads to a further result, such as a grant of access to a system. This type of authentication is relevant to many fields—it authorises human-to-machine interactions to enable access to systems, applications, and even resources. One field in which authentication is widely used is in transaction systems, such as for making mobile payments.

Typically, authentication is carried out through the use of usernames and PINs (personal identification numbers) or passwords. Currently, password-based authentication is not considered to provide a high enough level of security in itself for many systems that contain sensitive information. In addition, users are prone to forgetting passwords or mistakenly entering the incorrect password resulting in the system becoming locked. Other authentication mechanisms are increasingly used—one such approach is biometric authentication.

Biometric authentication uses the unique biological characteristics of individuals to validate the identity of the individual for access to a system. Examples of biological characteristics that can be relied upon for biometric authentication to include fingerprints, hand geometry, retina and iris patterns, face recognition, voice waves and signatures. A biometric authentication process can be used to secure a range of electronic communications such as online banking, logging into a computer or smartphone or making payments. Typically, the biometric authentication system compares the captured biometric data to authentic data that is stored in a database. Provided the two data samples match with each other, authentication would be confirmed and access to the system would be granted.

There are currently many issues with biometric authentication systems. Recognition errors are commonplace in this field. These errors comprise two types: the false accept rate, which is when a non-matching pair of biometric data is wrongly accepted as a match by the system, and the false reject rate, which is when a matching pair of biometric data is wrongly rejected by the system.

Another important issue with biometric systems concerns attacks. To authenticate the user, a newly acquired input signal is matched against an original signal that has been previously acquired from the user and stored in a database. If the new signal matches the original signal, access to the system is granted. Unsurprisingly, there are many areas of attack in a biometric system.

For example, by presenting fake biometrics or stored digitised biometrics signals. Other examples include intercepting and modifying the data that travels between the stored original signals and the matching mechanism, or corrupting the matching mechanism to product pre-selected match scores.

While face recognition is considered to be a particularly convenient form of biometric authentication, there are weaknesses in current systems. Face recognition uses the spatial geometry of distinguishing features of the face to authenticate a user. However, face recognition does not always work well with poor lighting, low resolution or objects that partially cover the user's face. In addition, difficulties often arise if the user fails to look directly into the camera or if the face of the user changes with ageing. Therefore it is difficult to accurately authenticate the recognition of the user's face. Arguably the most important difficulty with face recognition software is to implement a suitable level of security for authentication processes. Therefore there is scope for improvement on current approaches to biometric authentication.

The present disclosure has been devised to mitigate or overcome at least some of the above-mentioned problems.

SUMMARY OF THE DISCLOSURE

According to an aspect of the present disclosure there is provided a method of biometric authentication of a user. The method comprises capturing a biometric sample from a user and obtaining information to identify data sources relevant to the user. The method further comprises using the data sources relevant to the user to obtain a plurality of biometric samples potentially captured from the user. The method further comprises matching the captured biometric sample against the plurality of potentially captured biometric samples to determine whether the captured biometric sample represents the user.

The biometric sample may be an image of the user's face.

The biometric sample may be obtained at a mobile computing device of a user.

Obtaining the plurality of biometric samples and matching the captured biometric sample against the plurality of biometric samples potentially captured from the user may be carried out remotely from the mobile computing device of a user.

The mobile device may be adapted to perform a mobile application, and biometric authentication may be carried out to meet a requirement of the mobile application.

The mobile application may be a mobile payment application, and the requirement of the mobile application may be performance of a transaction.

Information to identify data sources relevant to the user may comprise contacts of the user and social media account information of the user.

The method may further comprise providing information relating to user identity or behaviour, including one or more of mobile device location, user home location and user employer and work location.

The method step of obtaining a plurality of biometric samples potentially captured from the user may comprise using the captured image to obtain matching images and associated metadata from a plurality of information sources.

The method step of matching the captured biometric sample against the plurality of potentially captured biometric samples may comprise comparing the information to identify data sources relevant to the user and/or the information relating to user identity or behaviour with the associated metadata.

The method step of obtaining a plurality of biometric samples potentially captured from the user may comprise analysing social networks of the user to determine higher order contacts, and searching for images identified as being of the user by one or more of the higher order contacts.

The method of biometric authentication of a user may further comprise collating the results received for the higher order contacts. The method may further comprise calculating a confidence threshold for identifying the user as represented by the image from the images retrieved and associated metadata.

According to an aspect of the present disclosure there is provided a computing device adapted for biometric authentication of a user. The computing device may comprise at least one processor, at least one memory and a biometric capture means. The computing device may be adapted to capture a biometric sample from the user and to determine information to identify data sources relevant to the user. The computing device may be further adapted to provide the captured biometric sample and the information to identify data sources relevant to the user to a biometric matching service.

The biometric capture means of the computing device may comprise a camera and the biometric sample may be an image of the user's face.

According to an aspect of the present disclosure there is provided a biometric matching service. The biometric matching service may be adapted to receive a captured biometric sample from a user together with information to identify data sources relevant to the user;

The matching service may use the data sources relevant to the user to obtain a plurality of biometric samples potentially captured from the user.

The matching service may match the captured biometric sample against the plurality of potentially captured biometric samples to determine whether the captured biometric sample represents the user.

BRIEF DESCRIPTION OF THE DRAWINGS

One or more embodiments of the disclosure will now be described, by way of to example only, with reference to the accompanying drawings, in which like components are assigned like numerals and in which.

DETAILED DESCRIPTION

Figure 1:
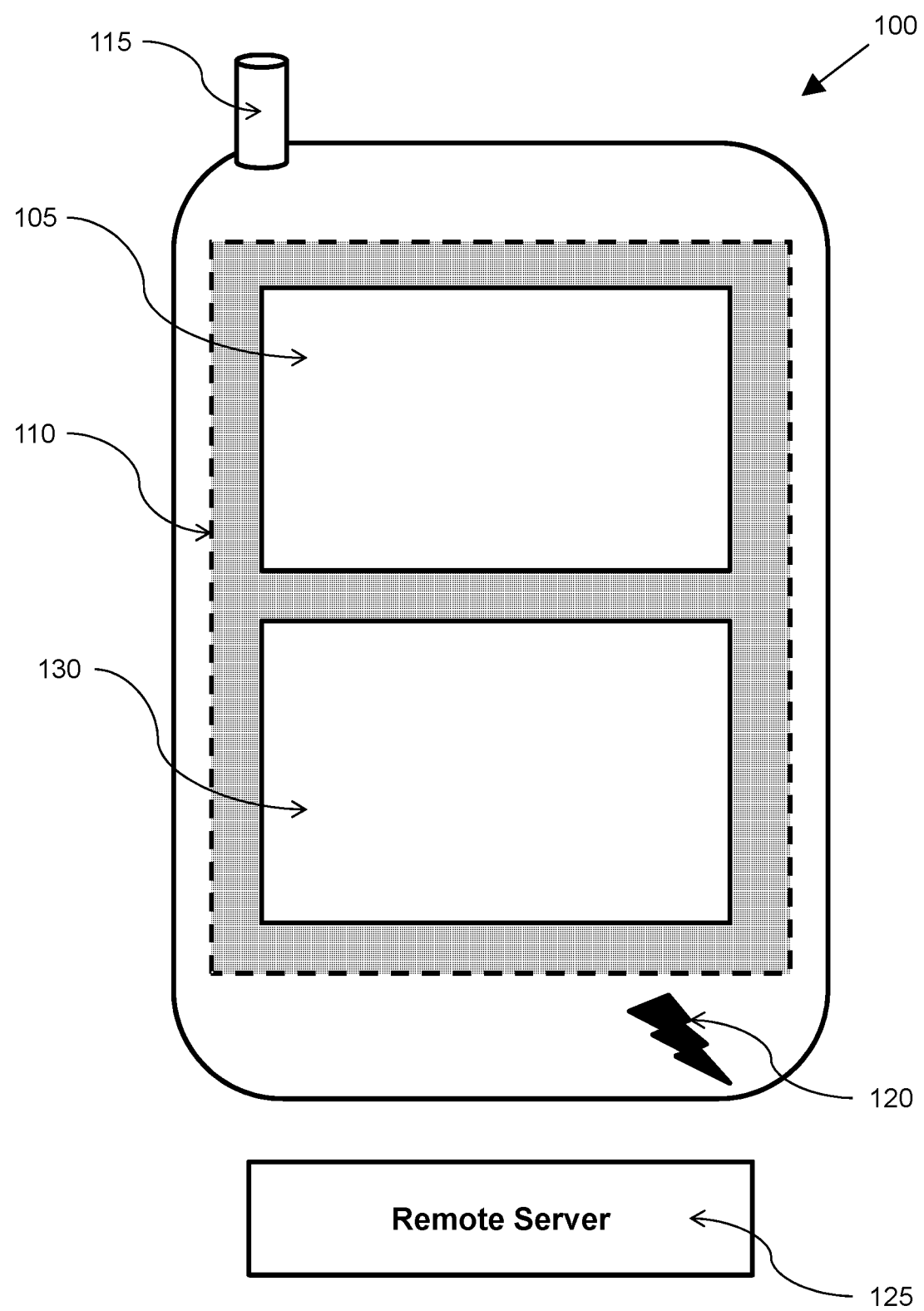
FIG. 1 illustrates schematically the relevant physical elements of a mobile computing device—in the embodiment shown, a mobile phone—in accordance with an embodiment of the disclosure.

Specific embodiments of the disclosure will be described below with reference to the Figures. The approach taken to authenticating a user is applicable to any form of computing device, but it has particular utility for mobile computing devices such as smart phones, and relevance to applications such as mobile banking. Given this relevance, FIG. 1 shows the relevant physical elements of a mobile computing device in the form of a smart phone. The smart phone of FIG. 1 is suitable for the implementation of embodiments of the disclosure as described with reference to FIGS. 2 to 6.

FIG. 1 shows schematically relevant parts of a representative hardware architecture for a mobile computing device suitable for implementing an embodiment of the disclosure. In the example shown, each mobile computing device is a mobile cellular telecommunications handset ("mobile phone" or "mobile device")—in other embodiments, the computing device may be another type of computing device such as a laptop computer or a tablet and the computing device need not have cellular telecommunications capabilities.

The mobile phone (100) in FIG. 1 comprises a SIM or USIM (105). The mobile phone also has a display (110) providing, in this example, a touchscreen user interface. The mobile phone (100) is equipped with a wireless telecommunications apparatus (115) for communication with a wireless telecommunications network and local wireless communication apparatus (120). A remote server (125) is also shown in FIG. 1. The mobile phone (100) can be connected to the remote server (125) by a network connection. The mobile phone also has a camera (130).

Figure 2:
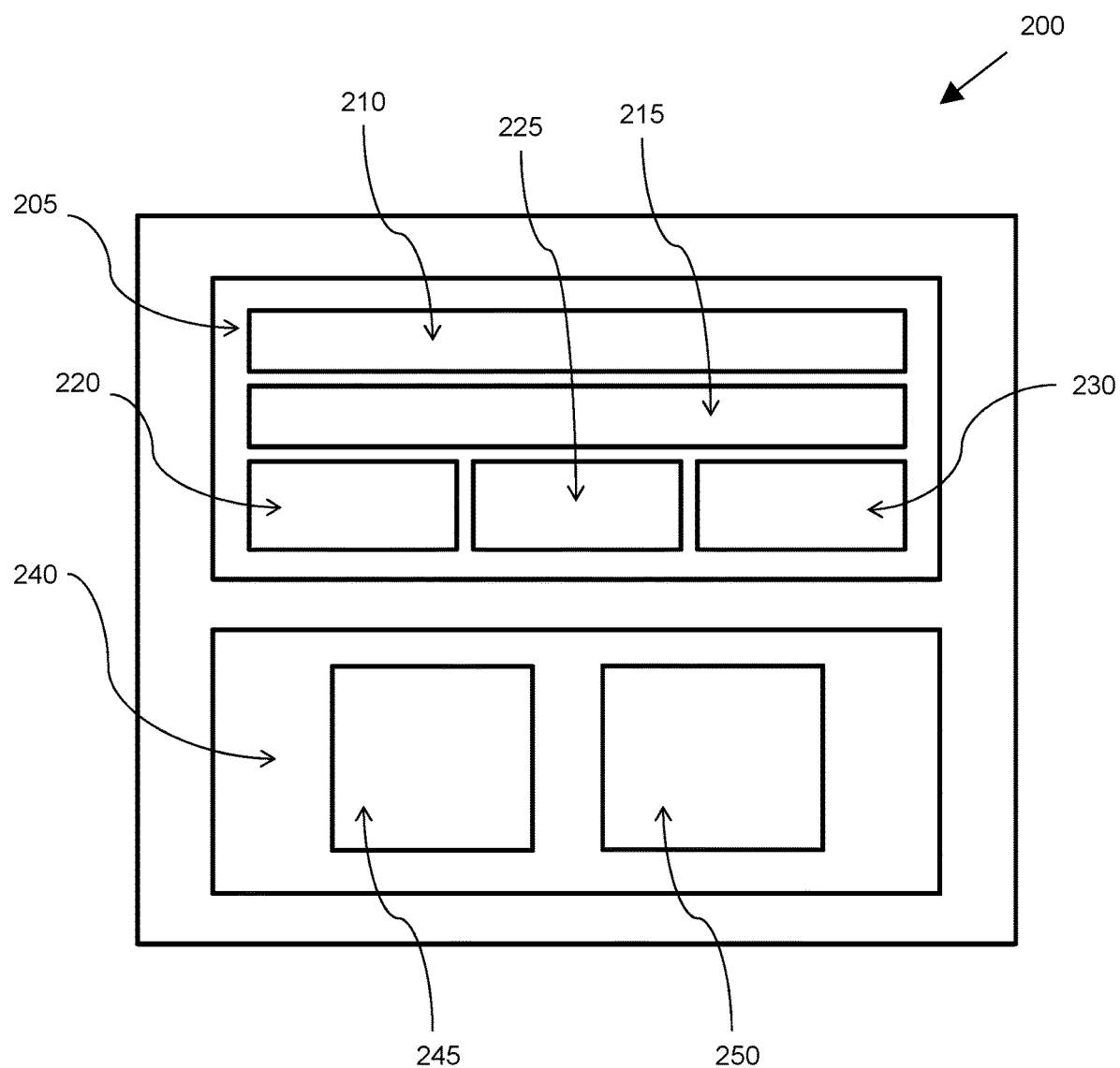
FIG. 2 illustrates schematically the software architecture of a mobile computing device, in accordance with an embodiment of the disclosure.

FIG. 2 illustrates the software architecture of a mobile computing device, in accordance with an embodiment of the disclosure. In FIG. 2, a main operating environment (205) of the mobile computing device is shown along with a protected operating environment (210). The protected operating environment may be a SIM (105). Alternatively, there may be a sandbox or other logically protected environment in the main operating environment to provide a secure environment.

The main operating environment (205) comprises an application processor (210) and associated memories (215). The main operating environment may be used with a generic operating system (such as iOS or Android). The main operating environment also comprises other applications normally needed by such a mobile computing device, such as a browser (220), a modem (225) and a camera driver (230).

The protected operating environment (240) may comprise a biometric application (245) and an application that uses the biometric application (245) for user authentication purposes. In this case, the application is a transaction application, specifically a mobile payment application (250), whereby the biometric application is called by the mobile payment application. In FIG. 2, both applications are explicitly shown in the protected operating environment. The applications may be located within the SIM or within another physically or logically protected environment so that third parties can have confidence in biometric results produced by the biometric application. Alternatively, some parts of the biometric application and the mobile payment application may be situated in the protected operating environment. Further, data from one or both of these applications may be located in a protected memory.

Figure 6:
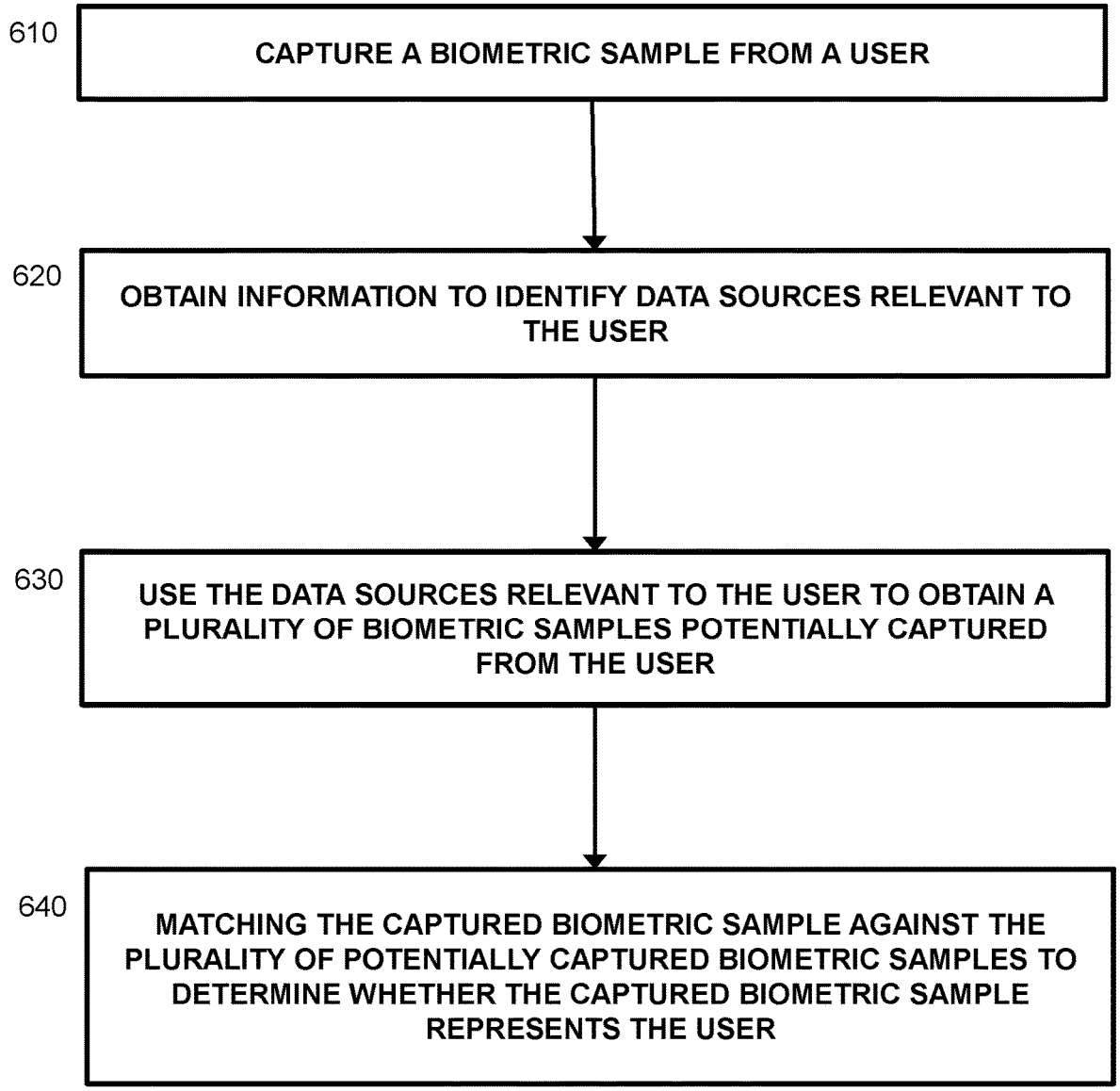
FIG. 6 illustrates schematically method steps in a general embodiment of the disclosure.

FIG. 6 shows a general embodiment of a method of biometric authentication of a user. First of all, a biometric sample is captured (610) from a user, and information is obtained (620) to identify data sources relevant to the user. These data sources relevant to the user are then used (630) to obtain a plurality of biometric samples potentially captured from the user. This is followed by matching (640) of the captured biometric sample against the plurality of potentially captured biometric samples to determine whether the captured biometric sample represents the user. The significance of each step will now be described in more detail, after which alternative embodiments will to also be discussed.

In embodiments described in more detail below, the biometric sample captured from the user is a digital image of the user's face for use in a face recognition or matching process captured by camera (130). In principle, other biometrics (such as a fingerprint or a voice print) could also be captured in this way, but embodiments of the disclosure described below are particularly well adapted to using captured facial images of a user.

The biometric sample will typically be provided from the user's mobile phone (100). Typically, the mobile payment application (250) will call the biometric application (245)—in the case of facial recognition or matching with the recognition to take place offline, the biometric application (245) may simply provide a structure for capture of an appropriately framed image of the user's face. The biometric sample may then be provided to a remote server for recognition or matching to take place to allow authentication, but with additional user data collected at the same time. This additional user data will identify data sources relevant to the user that will allow the collection of biometric samples for use in recognition or matching. In the case of a user facial image as biometric, the user data may for example include social media details and contact lists. These can be used to reference images provided by the user directly to a social media account, but also images of the user tagged by a known contact, for example. The user data may also include other data (such as the user's name, or employer name) that may be used to find images of the user from public data sources with an appropriate search engine. Other user data may be provided to assist in the authentication process by confirming that the use of the device—and the making of the request—was consistent with the behaviour of the user, as will be discussed further below.

In embodiments discussed in more detail below, the interpretation of the to captured biometric and its use for authentication will be carried out in a server remote from the user's mobile phone. In embodiments, however, this process may be carried out in whole or in part on the user's mobile phone, preferably in such a way that a third party can have confidence in the authentication result (with relevant processes or data secured or appropriately protected). In the approach discussed below, however, the matching or recognition process and the authentication result are achieved remotely, with an authentication result transmitted back to the user mobile phone and/or to any other system element that should receive this information, depending on the reason why authentication is required.

Different approaches to providing an authentication process according to embodiments of the disclosure will now be discussed below with references to FIGS. 3 to 5. These differ primarily in how the biometric samples for matching are obtained, and how the authentication process is carried out.

Figure 3:
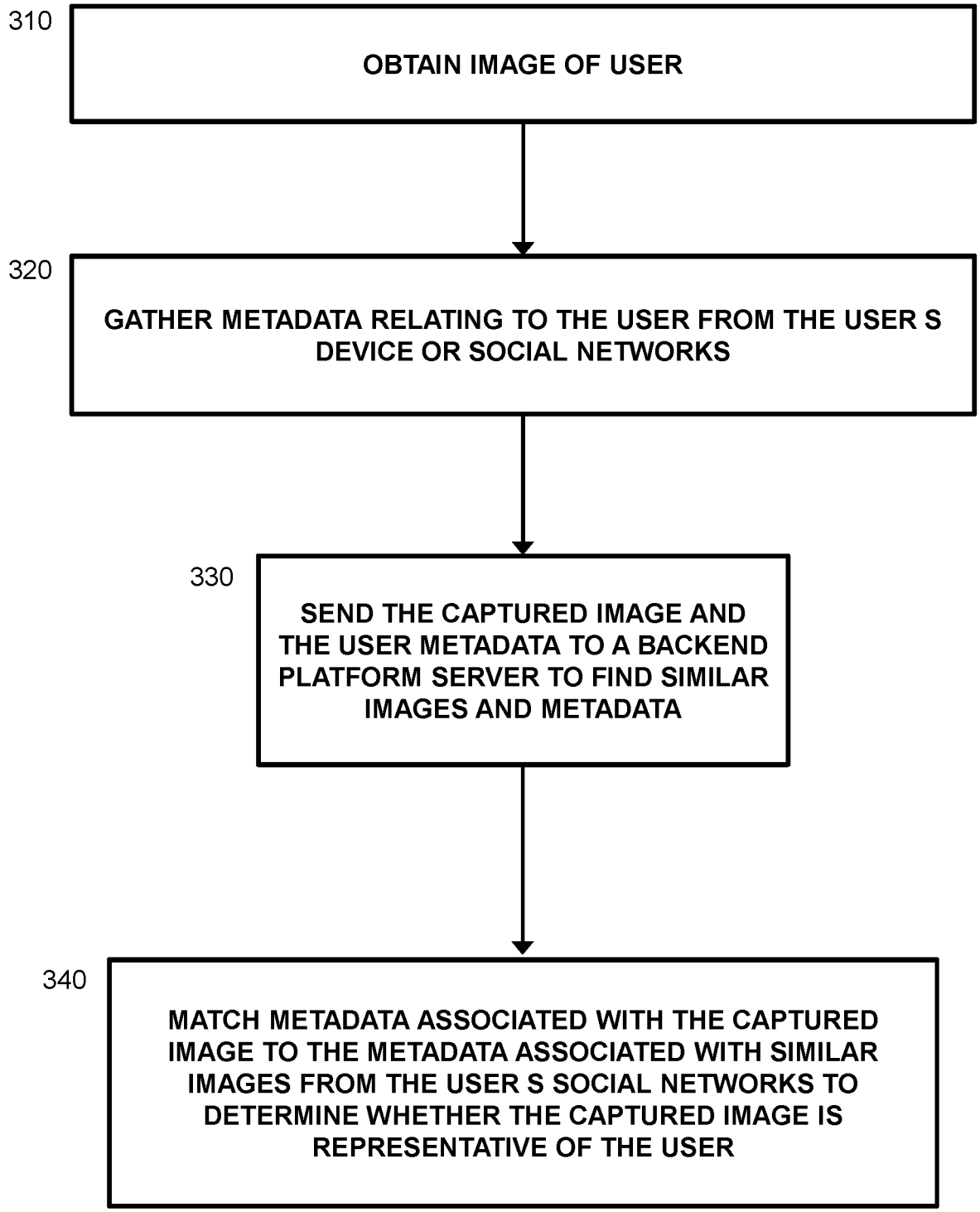
FIG. 3 illustrates schematically method steps in a first embodiment of the disclosure.

FIG. 3 illustrates schematically method steps in a first embodiment of the disclosure. The first step is for the application to take a picture of the user's face (310). This may be prompted by the relevant mobile application at a time at which authentication of the user is needed—for example, in registering for a service, or in the case of a payment application, in instructing a mobile payment. The mobile application would then gather (320) metadata relating to the user, such as user contacts, user employer, user home or work location, and so on. This information may be obtained from the user's device, (for example from the user contact directory), or possibly from the user's social network—some of this user data may be determined in advance by the mobile application, or it may be collected at the time of image capture. The image and the user metadata is then sent (330) to a backend platform server. The image is sent to information sources on its own (hence this is termed "Blind Mode" subsequently) and used to find similar images. These information sources may simply be the corpus of information on the public internet searched by search engines, or may be information within one or another social network to which the user is subscribed. Different social networks may provide different fragments of information and metadata. For example, Facebook could provide images and social feeds, whereas Google+ could provide information on the device used, such as the current location. Similar images are obtained, together with metadata. The metadata associated with the captured image is then matched (340) to the metadata from the images retrieved from the public internet or the user's social networks. This matching of metadata is carried out in a server remote from the user's mobile phone. If there is sufficient correspondence in metadata, then the captured image is considered to be a representative image of the user, and the user may then be authenticated.

The matching of the metadata may be carried out in numerous ways. Some examples are outlined below.

Metadata may comprise any information about the user inferred from the image or a profile associated with the image. This may include, for example, geo-tagging or current location. Social networks such as Google and Facebook harvest information about the location of the user, for example the last known location or a number of recent locations or a home location. The camera may store the location at which the image was taken. The location retrieved from social networks may then be matched with the location associated with the captured image.

Metadata may also comprise the social graph—a representation of the interconnection of relationships in an online social network—of the user. Both Google+ and Facebook have information about the social graph of a user. A list of names obtained from the social network may be compared with a list of contacts obtained from a user's device.

Metadata may also comprise information about calls that have been made and messages that have been sent from the user's device. This information may then be compared with the history retrieved from the device at the time of authentication.

Metadata may also comprise deep learning image analysis. This may involve determining background objects, such as faces, locations or monuments. For example, the face in the background may be matched with an image of the person on the contact list on the user's device.

A further matching technique may be to consider the user's Bluetooth connection history. For example, if a user's phone is synched to their car while driving, then information associated with that device and the user's relationship with that device may be used to provide additional metadata.

Figure 4:
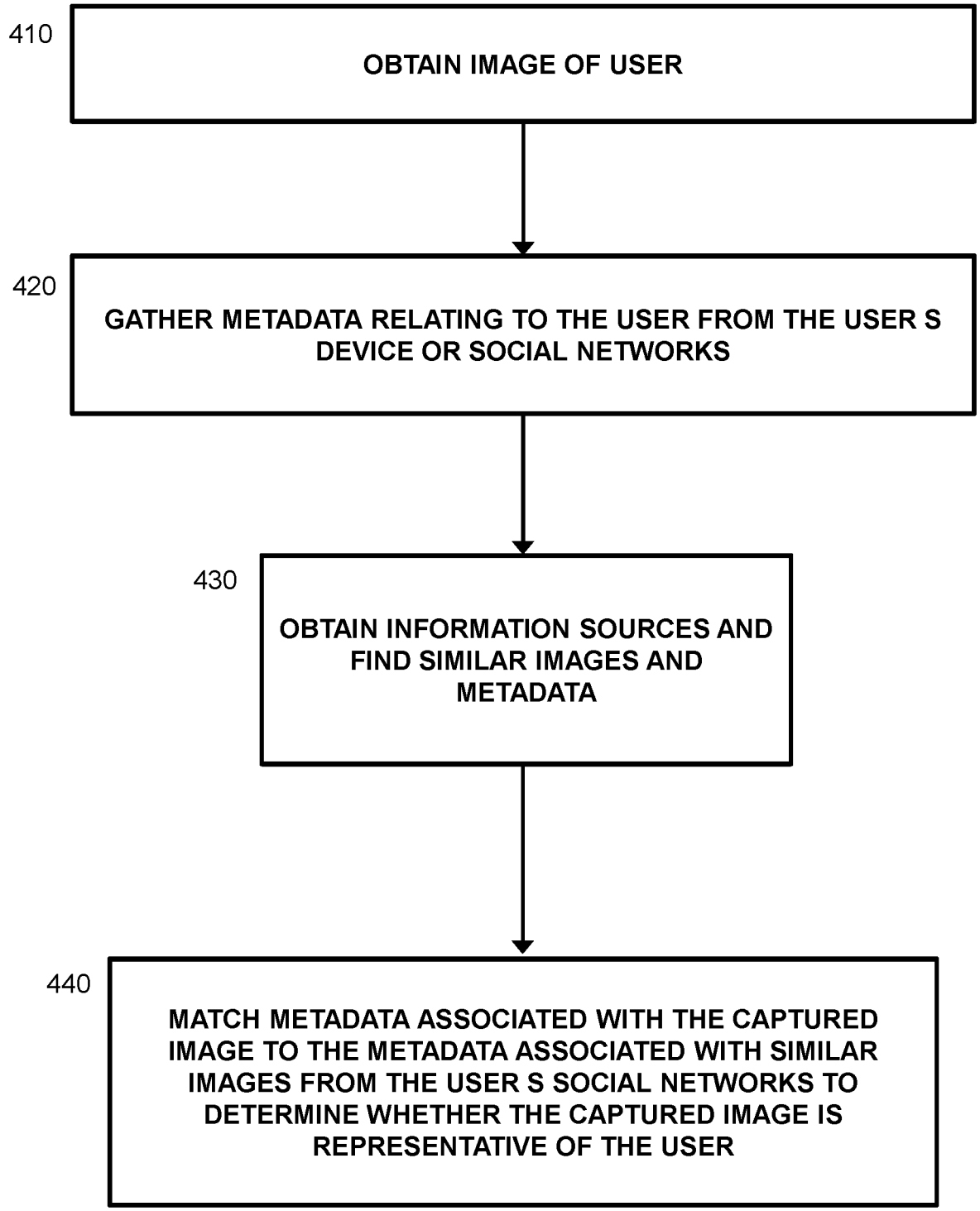
FIG. 4 illustrates schematically method steps in a second embodiment of the disclosure.

FIG. 4 illustrates schematically method steps in a second embodiment of the disclosure. The first step is for the application to obtain a picture of the user's face (410). This may be prompted by the relevant mobile application at a time at which authentication of the user is needed—for example, in registering for a service, or in the case of a payment application, in instructing a mobile payment. The mobile application would then gather (420) metadata relating to the user, such as user contacts, user employer, user home or work location, and so on. This information may be obtained from the user's device (for example from the user contact directory) or possibly from the user's social network—some of this user data may be determined in advance by the mobile application, or it may be collected at the time of image capture. Information sources are obtained and used to find similar images (430). In this mode, the application carries out the search of the information sources. These information sources may simply be the corpus of information on the public internet searched by search engines, or may be information within one or another social network to which the user is subscribed (this mode is termed "Social Graph" mode). Different social networks may provide different fragments of information and metadata. For example, Facebook could provide images and social feeds, whereas Google+ could provide information on the device used, such as the current location. Similar images are obtained, together with metadata. The metadata associated with the captured image is then matched (440) to the metadata from the images retrieved from the public internet or the user's social networks. This matching of metadata is carried out in a server remote from the user's mobile phone. If there is sufficient correspondence in metadata, then the captured image is considered to be a representative image of the user, and the user may then be authenticated.

Certain metadata will be used differently in the FIG. 3 and FIG. 4 embodiments. Some metadata may be used in the same way in both FIG. 3 and FIG. 4—for matching against metadata associated with retrieved images to determine whether the images are genuinely images of the user. However, some metadata that may be used for matching in the FIG. 3 arrangement may be used instead in the search of the information sources and for obtaining the retrieved images in the embodiment in FIG. 4.

Figure 5:
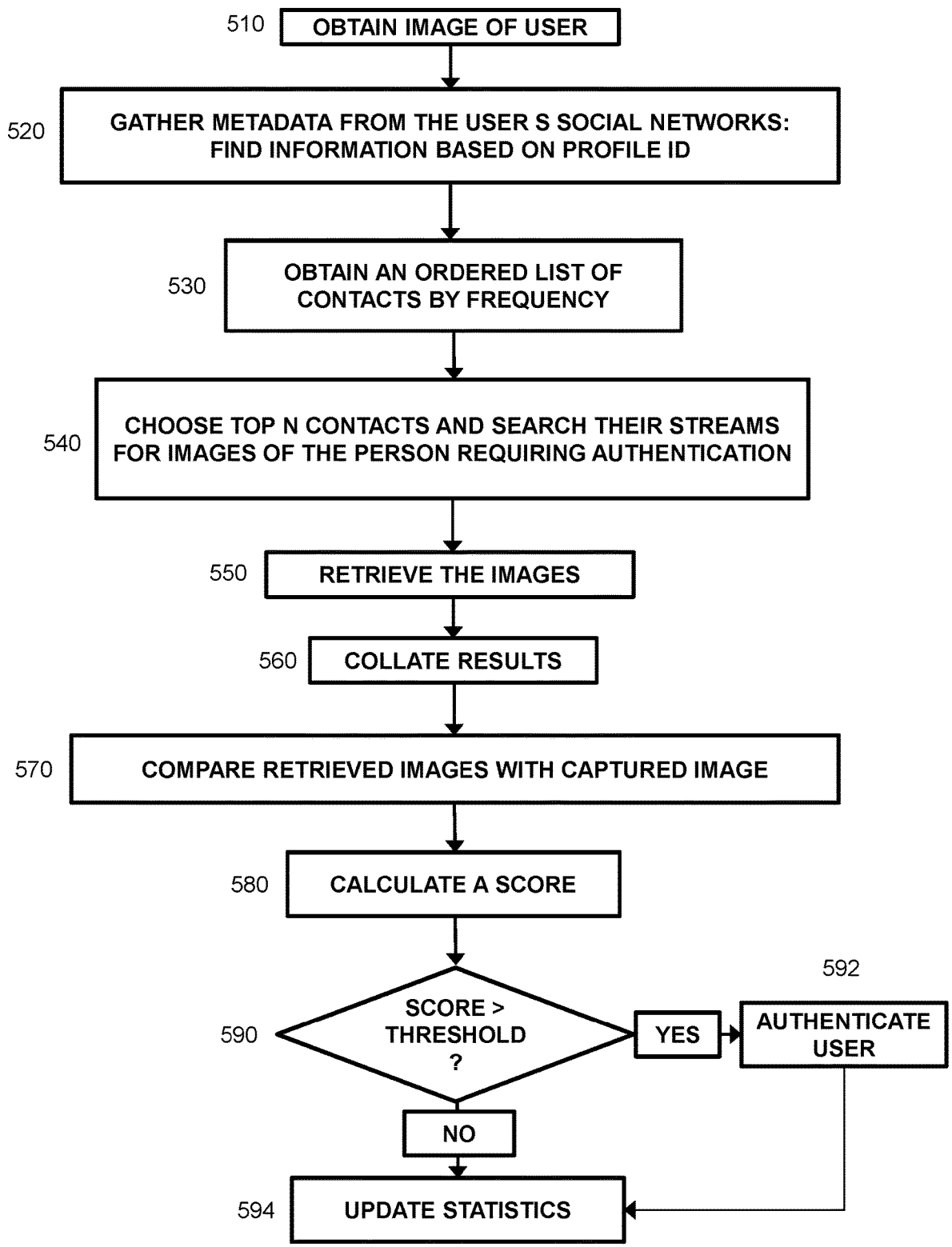
FIG. 5 illustrates schematically method steps in a further embodiment of the disclosure.

FIG. 5 illustrates schematically method steps in a further embodiment of the disclosure. These method steps refer to the "Social graph mode" operation of the method. The first step is for the application to obtain a picture of the user's face (510). This may be prompted by the relevant mobile application at a time at which authentication of the user is needed—for example, in registering for a service, or in the case of a payment application, in instructing a mobile payment. The mobile application would then gather (520) metadata relating to the user, such as user contacts, user employer, user home or work location, and so on. This information may be obtained from the user's device (for example from the user contact directory) or possibly from the user's social network—some of this user data may be determined in advance by the mobile application, or it may be collected at the time of image capture. Information sources are obtained and used to find similar images. These information sources may simply be the corpus of information on the public internet searched by search engines, or may be information within one or another social network to which the user is subscribed (this mode is termed "Social Graph" mode). Different social networks may provide different fragments of information and metadata. For example, Facebook could provide images and social feeds, whereas Google+ could provide information on the device used, such as the current location. The application would then obtain (530) an ordered list of contacts by frequency. One or more top contacts would then be chosen (540). The application would then search the streams of the top contacts for images of the user requiring authentication. Matching images are retrieved (550), together with metadata and the results are collated (560) by the application. The metadata associated with the captured image is then compared (570) to the metadata from the images retrieved from the public internet or the user's social networks, for example from the streams of the top contacts. A score is calculated (580) from the comparison results. The score is then compared (590) to a threshold value. If the score is above the threshold value, there is sufficient correspondence in the metadata. In this case, the captured image is considered to be a representative image of the user, and the user may then be authenticated (592). If the calculated score is below the threshold value, the statistics are updated (594).

Further embodiments of the disclosure may be provided in accordance with the scope of the disclosure as defined here.

The invention claimed is:

1. A method of biometric authentication of a user, comprising:
   capturing an image of a user's face by a camera of a user device of a user;
   obtaining user information relating to the user to identify data sources relevant to the user from at least one of the user device and a social network of the user;
   using the identified data sources relevant to the user to analyze social networks and obtain a plurality of biometric samples potentially captured from the user and to obtain metadata of the user, and to determine higher order contacts and search for images identified as being of the user by one or more of the higher order contacts;
   collating the results received for the higher order contacts and calculating a confidence threshold for identifying the user as represented by images and associated metadata retrieved from the higher order contacts;
   transmitting the user information, metadata from the user's device and the confidence threshold to a backend platform server to identify similar images and associated metadata from at least two information sources on the public internet; and
   obtaining, from the backend server, an indication that the metadata associated with the identified similar images sufficiently corresponds to the metadata from the user's device to authenticate the user.

2. The method of claim 1, wherein obtaining the plurality of biometric samples and matching the captured biometric sample against the plurality of biometric samples potentially captured from the user are carried out remotely from the mobile computing device of a user.

3. The method of claim 1, wherein the mobile device is adapted to perform a mobile application, and wherein biometric authentication is carried out to meet a requirement of the mobile application.

4. The method of claim 3, wherein the mobile application is a mobile payment application, and the requirement of the mobile application is performance of a transaction.

5. The method of claim 1, further comprising providing information relating to user identity or behaviour, including one or more of mobile device location, user home location and user employer and work location.

6. The method of claim 1, wherein the metadata from the user's device is related to at least one of user location information, a social graph of user interconnection relationships, information about user calls made from the user's device, information of user messages sent from the user's device, information from a deep learning image analysis, and information associated with the user's Bluetooth connection history.

7. The method of claim 6, wherein the user location information comprises at least one of a last known location of the user, a number of recent locations of the user, a home location of the user, and a location at which the biometric sample was obtained.

8. The method of claim 6, wherein the information from deep learning analysis comprises a determination of background objects in an image of the user.

9. A mobile computing device configured for biometric authentication of a user, comprising:
   at least one processor;
   at least one memory; and
   a biometric capture device, wherein the at least one processor, at least one memory, and biometric capture device cooperate to:
      capture a biometric sample from the user;
      obtain user information relating to the user to identify data sources relevant to the user from at least one of the user device and a social network of the user;
      use the identified data sources relevant to the user to analyze social networks and obtain a plurality of biometric samples potentially captured from the user and to obtain metadata of the user, and to determine higher order contacts and search for images identified as being of the user by one or more of the higher order contacts;
      collate the results received for the higher order contacts and calculate a confidence threshold for identifying the user as represented by images and associated metadata retrieved from the higher order contacts;
      transmit the user information, metadata from the user's device and the confidence threshold to a backend platform server to identify similar images and associated metadata from at least two information sources on the public Internet; and
      obtain an indication from the backend server that the metadata associated with the identified similar images sufficiently corresponds to the metadata from the user's device to authenticate the user.

\* \* \* \* \*